(12) United States Patent
Chang et al.

(10) Patent No.: US 7,813,341 B2
(45) Date of Patent: Oct. 12, 2010

(54) OVERHEAD REDUCTION FOR MULTI-LINK NETWORKING ENVIRONMENTS

(75) Inventors: Fu-Chung Chang, Rhinebech, NY (US); Carol L. Soto, Highland, NY (US); Jian Xiao, LaGrangeville, NY (US)

(73) Assignee: International Business Machines Corporation, Armonk, NY (US)

( * ) Notice: Subject to any disclaimer, the term of this patent is extended or adjusted under 35 U.S.C. 154(b) by 249 days.

(21) Appl. No.: 12/021,871

(22) Filed: Jan. 29, 2008

(65) Prior Publication Data

US 2009/0190581 A1    Jul. 30, 2009

(51) Int. Cl.
*H04L 12/28* (2006.01)
(52) U.S. Cl. .................. 370/389; 370/229; 370/236
(58) Field of Classification Search ............... 370/351, 370/389
See application file for complete search history.

(56) References Cited

U.S. PATENT DOCUMENTS

| | | | |
|---|---|---|---|
| 5,572,546 A | 11/1996 | Serfaty et al. | |
| 6,295,276 B1 | 9/2001 | Datta et al. | |
| 6,304,912 B1 | 10/2001 | Oguchi et al. | |
| 6,954,794 B2 * | 10/2005 | Rudd et al. | 709/230 |
| 7,310,683 B2 * | 12/2007 | Shobatake | 709/238 |
| 2006/0256767 A1 | 11/2006 | Suzuki et al. | |
| 2006/0262772 A1 * | 11/2006 | Guichard et al. | 370/351 |
| 2007/0001853 A1 * | 1/2007 | Otranen | 340/572.1 |
| 2007/0053283 A1 | 3/2007 | Bidwell et al. | |

OTHER PUBLICATIONS

Shen et al, Self-stabilizing Routing in Publish-Subscribe Systems, 2004, 6 pages, Iowa State University, Ames, Iowa.

* cited by examiner

*Primary Examiner*—Pankaj Kumar
*Assistant Examiner*—Gautam Sharma
(74) *Attorney, Agent, or Firm*—Jeffrey N. Giunta; Fleit Gibbons Gutman Bongini & Bianco PL (57) ABSTRACT

A method, computing node, and computer program storage product maintain network routing information. A first node receives a route status request from a second node. A status is stored at the first node indicating that a route from the second node to the first node is valid only in response to receiving the route status request. The first node transmits a route status reply to the second node.

20 Claims, 7 Drawing Sheets

OVERHEAD REDUCTION FOR MULTI-LINK NETWORKING ENVIRONMENTS

STATEMENT REGARDING FEDERALLY SPONSORED RESEARCH OR DEVELOPMENT

This invention was made with government support under agreement no. HR0011-07-9-0002 awarded by DARPA. The government has certain rights in the invention.

FIELD OF THE INVENTION

The present invention generally relates to the field of networking, and more particularly relates to reducing overhead in multi-link networking environments.

BACKGROUND OF THE INVENTION

Many networks employ multiple network adapters or multi-port network adapters. These environments are utilizing various technologies to exploit the multiple physical links created by the multiple adapters, thereby achieving high network availability, reliability, and performance. Among these technologies are Cisco's EtherChannel, the industrial standard 802.3ad, and Ethernet Bonding for LINUX. One major drawback of these technologies is that they are designed and implemented specifically for Ethernet. As the emergence of new interconnect technologies such as InfiniBand starts to effect the replacement of the Ethernet infrastructure, the existing Ethernet only solutions are not sufficient. Additionally, these technologies can only be implemented for a single adapter type such as Ethernet. Therefore, the network environment generally cannot comprise network adapters of different types.

Therefore a need exists to overcome the problems with the prior art as discussed above.

SUMMARY OF THE INVENTION

In one embodiment, a method for maintaining network routing information is disclosed. The method includes receiving, by a first node, a route status request from a second node. A status is stored at the first node indicating that a route from the second node to the first node is valid only in response to receiving the route status request. The first node transmits a route status reply to the second node.

In another embodiment, a computing node, within a networking environment, for maintaining network routing information is disclosed. The computing node includes a network interface adapted to receive a route status request from at least one other computing node. The network interface is further adapted to store, in response to the route status being received, a status indicating that a route from the at least one other computing node to the computing node is valid. The network interface adapter is further adapted to transmit a route status reply to the at least one other computing node.

In yet another embodiment, a computer program storage product for maintaining network routing information is disclosed. The computer program storage product comprises a non-transitory storage medium readable by a processing circuit. The computer program storage product comprises instructions for receiving, by a first node, a route status request from a second node. A status is stored at the first node indicating that a route from the second node to the first node is valid only in response to receiving the route status request. The first node transmits a route status reply to the second node.

One embodiment of the present invention performs route probing so as to reduce traffic in a multi-link networking environment, thus reducing non-data carrying communications overhead in the network environment. In an example of one embodiment of the present invention operating in a steady state, half of the nodes in a cluster are designated as initiator nodes and perform the keep-alive requests while the other half of the nodes are responder nodes and only send replies to keep-alive requests. This is compared to conventional networks where each node sends keep-alive requests and keep-alive replies. Therefore, the various embodiments of the present invention effectively reduce the total number of keep-alive message traffic by half and thereby reduce communication overhead. One embodiment of the present invention further operates to allow an initiator node to notify a responder node of a failed communication link so that each node can update its routing tables accordingly.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

DETAILED DESCRIPTION

As required, detailed embodiments of the present invention are disclosed herein; however, it is to be understood that the disclosed embodiments are merely examples of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure and function. Further, the terms and phrases used herein are not intended to be limiting; but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. The terms program, software application, and other similar terms as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

Multi-Link Networking Environment

Figure 1:
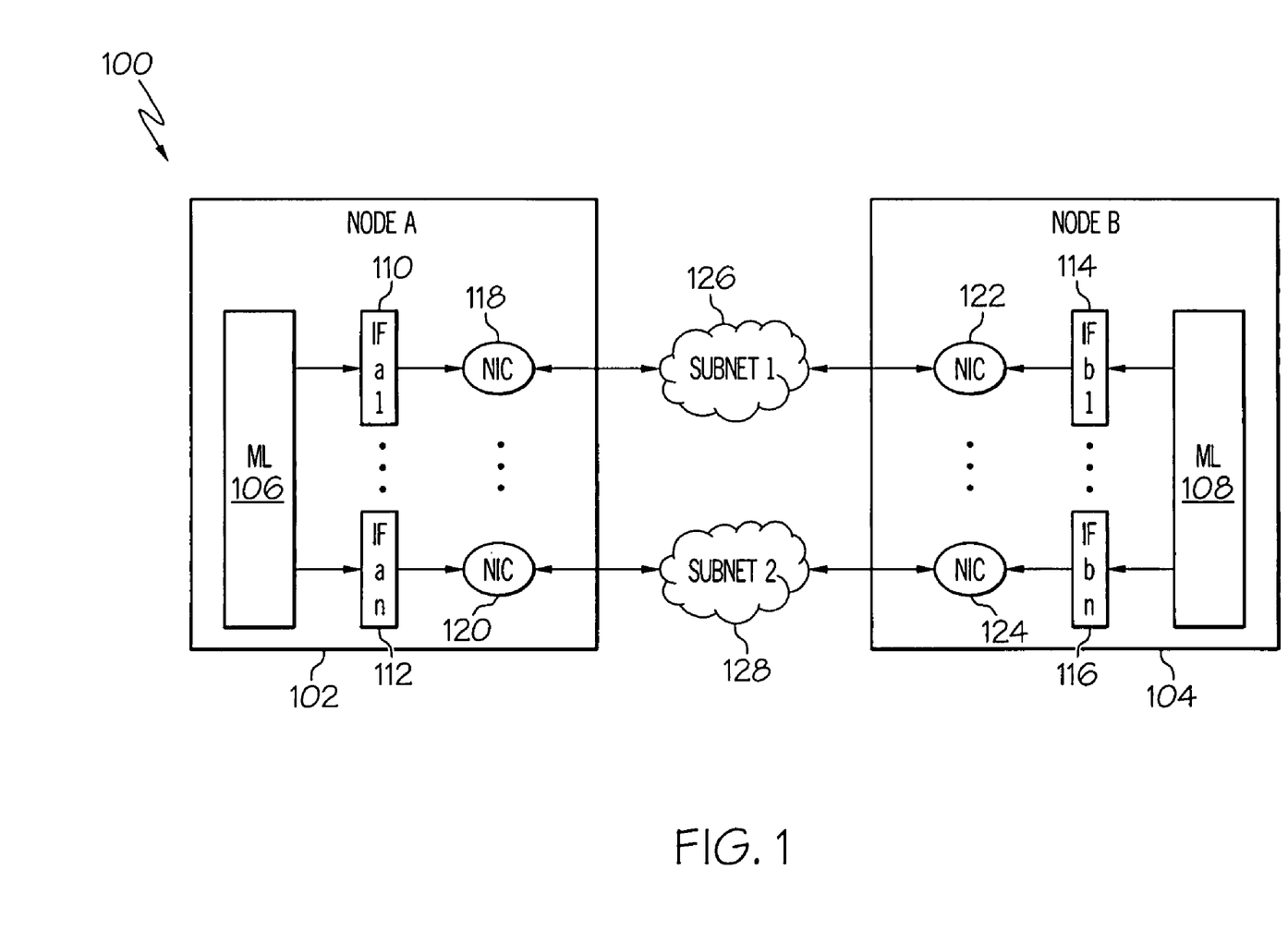
FIG. 1 is a block diagram illustrating an overall implementation of an ML interface in a networking environment.

FIG. 1 is a block diagram illustrating a multi-link ("ML") networking environment 100. ML is a pseudo interface driver that is situated between the IP layer and data-link layer. Stated differently, the ML interface works on top of an actual physical interface driver(s) in the physical layer. The ML interface is advantageous over current network adapter interfacing technologies because it can bind a number of real network interfaces of various types into one virtual interface. Therefore, the ML interface provides fault tolerance, load balancing and link aggregation.

An ML interface of one embodiment further exposes underlying physical interfaces. Unlike other technologies that physical interfaces, the ML interface leaves the physical interfaces visible. Each underlying interface still bears its own unique layer 2 and layer 3 addresses. Cluster manager operations are sometimes able to be aided by seeing and managing the individual physical interfaces. The ML interface is also able to operate concurrently with applications that choose to directly use and manage the physical interface to run concurrently. Yet another advantage is that the ML interface can discover, maintain, and recover underlying routes between two end points. The ML interface does not rely on the physical device driver for the link status; instead the ML interface includes a complete state machine that can quickly detect any end-to-end route change. The ML interface also does not require any special settings on a network switch.

FIG. 1 shows a pair of nodes, node A 102 and node B 104. When node A 102 initially contacts node B 104 through the ML interface 106 via one or more subnets 126, 128, the ML interface 106 on node A 102 broadcasts a route discovery request through each of its underlying interfaces A1 110 through An 112 (which are all communicatively coupled to a respective Network Interface Controller ("NIC") 118, 120, 122, 124 that is associated with that particular interface). When the ML interface 108 on node B 104 receives the broadcast message from node A 102, the ML interface 108 replies to node A 102 through its underlying interfaces B1 114 through Bn 116. Upon receiving each reply, the ML interface 106 on node A 102 establishes a valid route for each of its physical interfaces 110, 112 and caches the route in its ML routing table (not shown).

A conventional method of maintaining a route table between the ML interfaces 106, 108 uses a timer (not shown). For every timer tick, the ML interface 106, 108 walks through its routing table and sends unicast keep-alive requests for all routes. Based on the replies back, the ML interface 106, 108 updates the status of each route. If the ML interface 106, 108 does not receive a reply for a certain number of consecutive probe requests, the ML interface 106, 108 declares the route "down" and excludes it from being used in communication. On the other hand, if the ML interface 106, 108 begins to receive replies for a route which was in "down" state, the ML interface 106, 108 marks the route as "up" and allows it to be used for communication again.

The above conventional approach works well for sparse and moderately dense networks. However, a conventional ML interface deployed in a fully-connected large cluster may pose scalability challenges. For example, if a cluster includes n nodes and each node has m physical interfaces, each node sends out $m*(n-1)$ keep-alive request messages per time tick, which makes the total number of requests sent $m*n*(n-1)$. Adding the number of keep-alive replies, the total number of messages becomes $2*m*n*(n-1)$. Note that these keep-alive probes are used by the ML interface for the purpose of maintaining/updating its routing information; they are not the actual communication traffic. In the case where n is very large, the number of keep-alive messages also becomes very large. This can impose a large communication overhead and degrade the system performance. Therefore, the various embodiments of the present invention provide a mechanism for reducing the communication overhead while preserving the correctness of the ML routing protocol.

Figure 2:
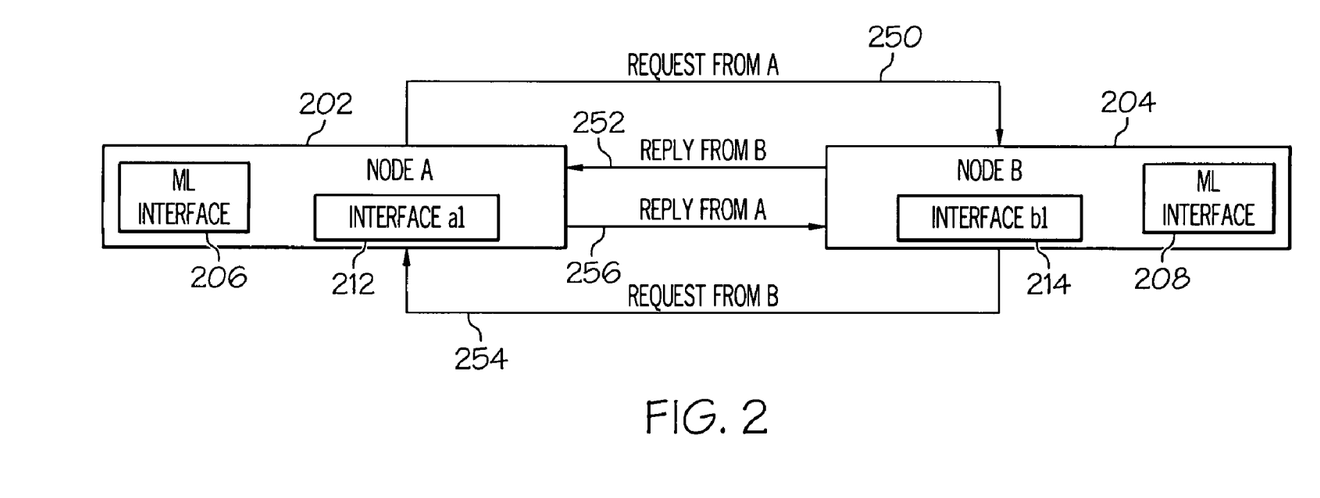
FIG. 2 is a block diagram illustrating a unicast probing request transaction between two nodes.

FIG. 2 shows an example of a pair of each sending unicast probes to maintain their internal routing tables. In particular, FIG. 2 shows Node A 202 communicatively coupled to Node B 204. In the example of FIG. 2, Node A 202 has an interface A1 212 and Node B has an interface B1 214, where each of the nodes 202, 204 are within the same subnet. With the approach discussed above, Node A 202 sends a unicast probe 250 from its interface A1 212 to Node B 204. The interface B1 214 of Node B 204 receives the unicast probe and sends a reply 252 back to the interface A1 212 of Node A 202. Upon receiving the reply, the ML interface 206 on Node A 202 identifies that the route through interface A1 212 to interface B1 214 is valid.

Similarly, interface B1 214 of Node B 204 performs a similar unicast request 254 to interface A1 212 of Node A 202. Upon receiving a reply 256 from interface A1 212, the ML interface 208 on Node B marks the route through interface B1 214 to interface A1 212 as valid.

The above approach may present an unnecessary redundancy. While Node A 202 and Node B 204 of the above conventional implementation each perform active probing independently, the route tables they maintain are essentially the same. This can generate large amounts of unneeded overhead as discussed above. Various embodiments of the present invention operate to reduce the overhead of the above described processing by configuring the nodes to perform only one round-trip probing operation between the interfaces 212, 214. Each of the nodes 202, 204, regardless of who was the initiator, can then determine if the link is valid or not. In normal operations, the various embodiments of the present invention reduce the probing overhead by at least half.

Figure 3:
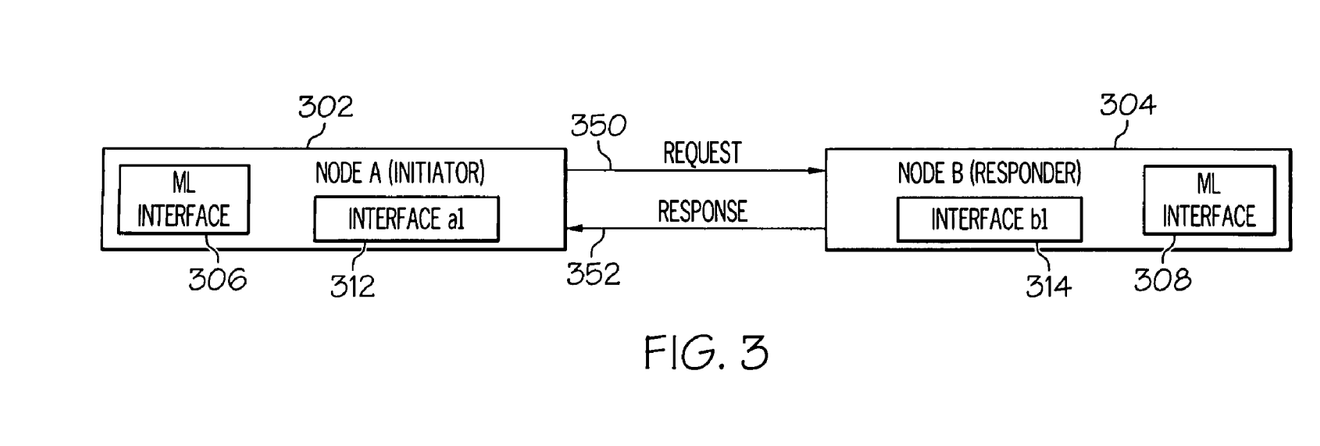
FIG. 3 is a block diagram illustrating a modified unicast probing request transaction between two nodes according to one embodiment of the present invention.

In one embodiment of the present invention, one of the nodes 202, 204 is configured to actively send a probe while the other node 204 is configured to passively reply to the request and to not initiate probes of its own. FIG. 3 shows one example of such an embodiment. In the example of FIG. 3, the node designated to send a probing request is referred to as the "initiator" and the node designated to respond to a probing request is referred to as the "responder." These designations, in one embodiment, can be determined by the IP address of the nodes. For example, the node with the highest IP address amongst a pair of nodes can be designated as the initiator, while the other node (i.e., the node with the lower IP address) is designated as the responder. In one embodiment, node assume a role as a responder or initiator based upon comparing indicating that a local IP address, e.g., an IP address associated with the node performing the processing, is lower than the IP address of another node.

The ML interfaces 306, 308 of each node 302, 304 are aware of the IP addresses of other nodes via broadcast events. For example, as discussed above, when a node joins the subnet, it performs a broadcast function to notify other nodes that it is on-line. Each of the ML interfaces 306, 308 maintain a record of the IP addresses of the other nodes obtained from the broadcast events. Therefore, when a pair of nodes is to begin probing operations the nodes can use this list of IP addresses to determine which node is to be the initiator node and which node is to be the responder node.

For example, with respect to FIG. 3, Node A 304, at the initial communication startup time, tries to communicate with Node B 302 by sending out a broadcast message through its interface A1 312. Upon receiving the broadcast message on its interface B1 314, the ML interface 308 on Node B 304 compares the ML IP address of Node A 302 (this information is carried in the broadcast message) with that of its own. If the IP address of Node B is higher, the ML interface 308 of Node B 304 sets Node B 304 as the initiator node. If the ML interface 308 of Node B 304 determines that the IP address of Node B 304 is lower than the IP address of Node A, the ML interface 308 of Node B 304 sets Node B 304 to be the responder node. The ML interface 308 of Node B 304 then records the route (B1-A1) and sends out the reply through its interface B1 314. When Node A 302 receives the reply on its interface A1 312, the ML interface 306 makes a decision on its role based on the same IP address comparison discussed above and records the route (A1-B1).

In the example of FIG. 3, Node A 302 is the initiator so it sends out "keep-alive" requests 350. Node B 304, which is the responder node, receives this request 350 and sends a reply 352 back to Node A 302. Node B 304, based upon receiving the keep-alive request 350, updates its routing table to indicate the route between itself and Node A 302 is valid. When Node A 302 receives the reply back from Node B 304, it updates its routing table to indicate the route between itself and Node B 304 is valid.

Figure 4:
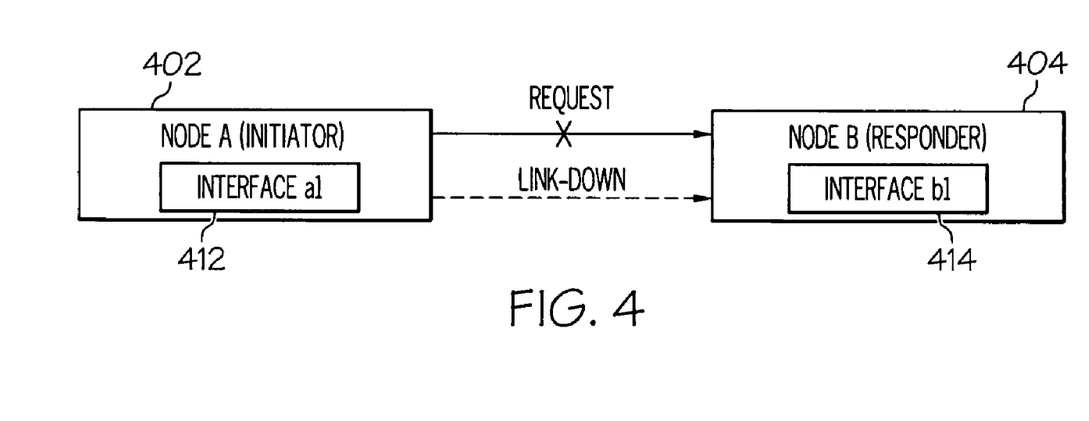
FIG. 4 is a block diagram illustrating a failed communication link between an initiator node and a responder node according to one embodiment of the present invention.

It should be noted that the out-bound link and/or in-bound link of a node can fail between the pair of nodes. For example, FIG. 4 illustrates a scenario where Node A 402 is the initiator node and Node B 404 is the responder node. In FIG. 4, the link from interface A1 412 of Node A 402 to interface B1 414 of Node B 404 is broken. In this example, each of the nodes can easily detect a failed since Node A 302 does not receive any replies after a given time interval and Node B 404 does not receive any requests after a given time interval. After these time intervals have past, each of these nodes determine that the link has failed.

Figure 5:
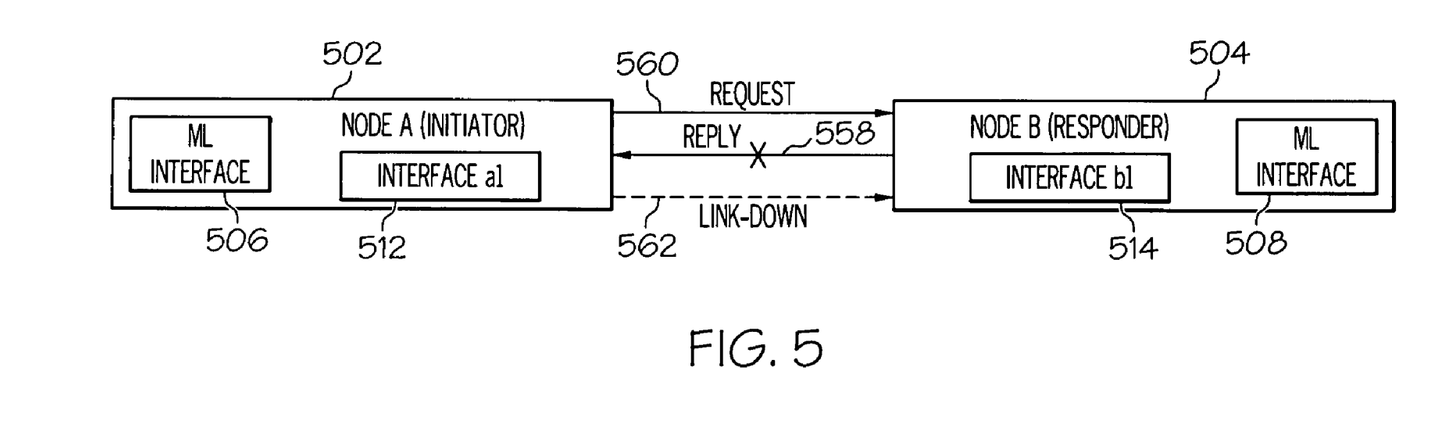
FIG. 5 is a block diagram illustrating a transaction between an initiator node and a responder node for notifying the responder node of a failed communication link according to one embodiment of the present invention.

FIG. 5 shows another example of a failed link 558 between Node A 502 and Node B. In particular, the link 560 from interface A1 512 of Node A 502 to interface B1 514 of Node B 504 is working, but the link 558 from interface B1 514 to interface A1 512 has failed. In this situation, Node A 502 is be able to detect that the link 558 has failed because it does not receive any replies form Node B 504 after a given time interval. However, based upon the failure of link 558 alone, Node B 504 would be unable to determine that link 558 has failed because it is the responder node and does not perform active probing. Furthermore, Node B 504 continues to receive requests from Node A 502 and therefore, identifies the route between itself and Node A as valid.

Therefore, in one embodiment, the ML interface 506 of Node A 502 generates and sends a "link-down" message 562 to notify Node B 504 that the route from node B 504 to node A 502 has failed. For example, after a given time interval has passed without receiving a reply back from Node B 504, the ML interface 506 of Node A 502 generates the "link-down" message 562. Node A 502 then transmits the "link-down" message 562 to Node B 504 so that it can mark the route A1-B1 as down.

As can be seen from the above discussion, the various embodiments of the present invention advantageously reduce route probing traffic in a multi-link networking environment. For example, in a steady state, half of the nodes in a cluster are designated as initiator nodes and perform the keep-alive requests while the other half of the nodes, are responder nodes and send keep-alive replies. This is compared to each node sending independent combinations of keep-alive requests and keep-alive replies. Therefore, the various embodiments of the present invention effectively reduce the total number of keep-alive traffic by half and thus, reduce communication overhead. Another advantage is that an initiator node can notify a responder node of a failed communication link so that each node can update is routing tables accordingly.

Information Processing Node

Figure 6:
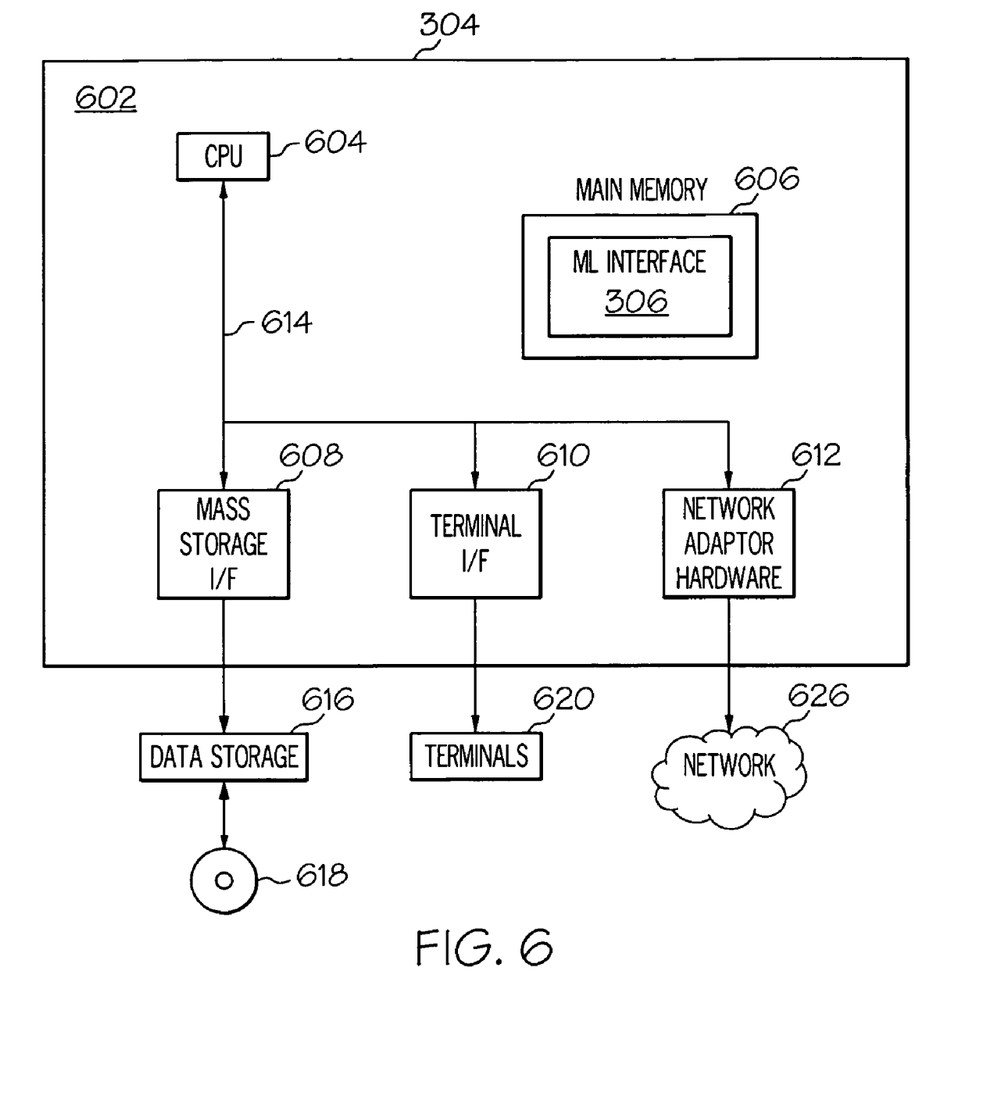
FIG. 6 is a block diagram illustrating a detailed view of an information processing node according to one embodiment of the present invention.

FIG. 6 is a block diagram illustrating a more detailed view of an information processing node such as information processing Node A 304 of FIG. 3 according to one embodiment of the present invention. It should be noted that the information processing node 600 can be (but not limited to) a server, a desktop computer, a notebook computer, or a personal digital assistant.

The information processing node 600 includes a computer 602. The computer 602 has a processor 604 that is connected to a main memory 606, mass storage interface 608, terminal interface 610, and network adapter hardware 612. A system bus 614 interconnects these system components. The mass storage interface 608 is used to connect mass storage devices, such as data storage device 616, to the information processing system 102. One specific type of data storage device is a computer readable medium reader, such as an optical disk drive, which may be used to read a computer readable medium, such a CD 618 or DVD (not shown) that is encoded with a program. Another type of data storage device is a data storage device configured to support, for example, NTFS type file system operations.

The main memory 606, in one embodiment, includes the ML interface 306 discussed above. Although illustrated as concurrently resident in the main memory 606, it is clear that respective components of the main memory 606 are not required to be completely resident in the main memory 606 at all times or even at the same time. In one embodiment, the information processing node 600 utilizes conventional virtual addressing mechanisms to allow programs to behave as if they have access to a large, single storage entity, referred to herein as a computer system memory, instead of access to multiple, smaller storage entities such as the main memory 606 and data storage device 616. Note that the term "computer system memory" is used herein to generically refer to the entire virtual memory of the information processing system 600.

Although only one CPU 604 is illustrated for computer 602, computer systems with multiple CPUs can be used equally effectively. Various embodiments of the present invention further incorporate interfaces that each includes separate, fully programmed microprocessors that are used to off-load processing from the CPU 604. Terminal interface 610 is used to directly connect one or more terminals 620 to computer 602 to provide a user interface to the computer 602. These terminals 620, which are able to be non-intelligent or fully programmable workstations, are used to allow system administrators and users to communicate with the information processing system 600. The terminal 620 is also able to consist of user interface and peripheral devices that are connected to computer 602 and controlled by terminal interface hardware included in the terminal I/F 610 that includes video adapters and interfaces for keyboards, pointing devices, and other devices/interfaces.

An operating system (not shown) included in the main memory is a suitable multitasking operating system such as (but not limited to) the Linux, UNIX, Windows XP, and Windows Server 2001 operating system. Various embodiments of the present invention are able to use any other suitable operating system. Some embodiments of the present invention utilize architectures, such as an object oriented framework mechanism, that allow instructions of the components of operating system (not shown) to be executed on any processor located within the information processing system 600. The network adapter hardware 612 is used to provide an interface to a network 626. Various embodiments of the present invention can be adapted to work with any data communications connections including present day analog and/or digital techniques or via a future networking mechanism.

Although the embodiments of the present invention are described in the context of a fully functional computer system, those skilled in the art will appreciate that various embodiments are capable of being distributed as a program product via CD or DVD, e.g. CD 618, CD ROM, or other form of recordable media, or via any type of electronic transmission mechanism.

Operation Flow for Designating A Node as an Initiator or Responder

Figure 7:
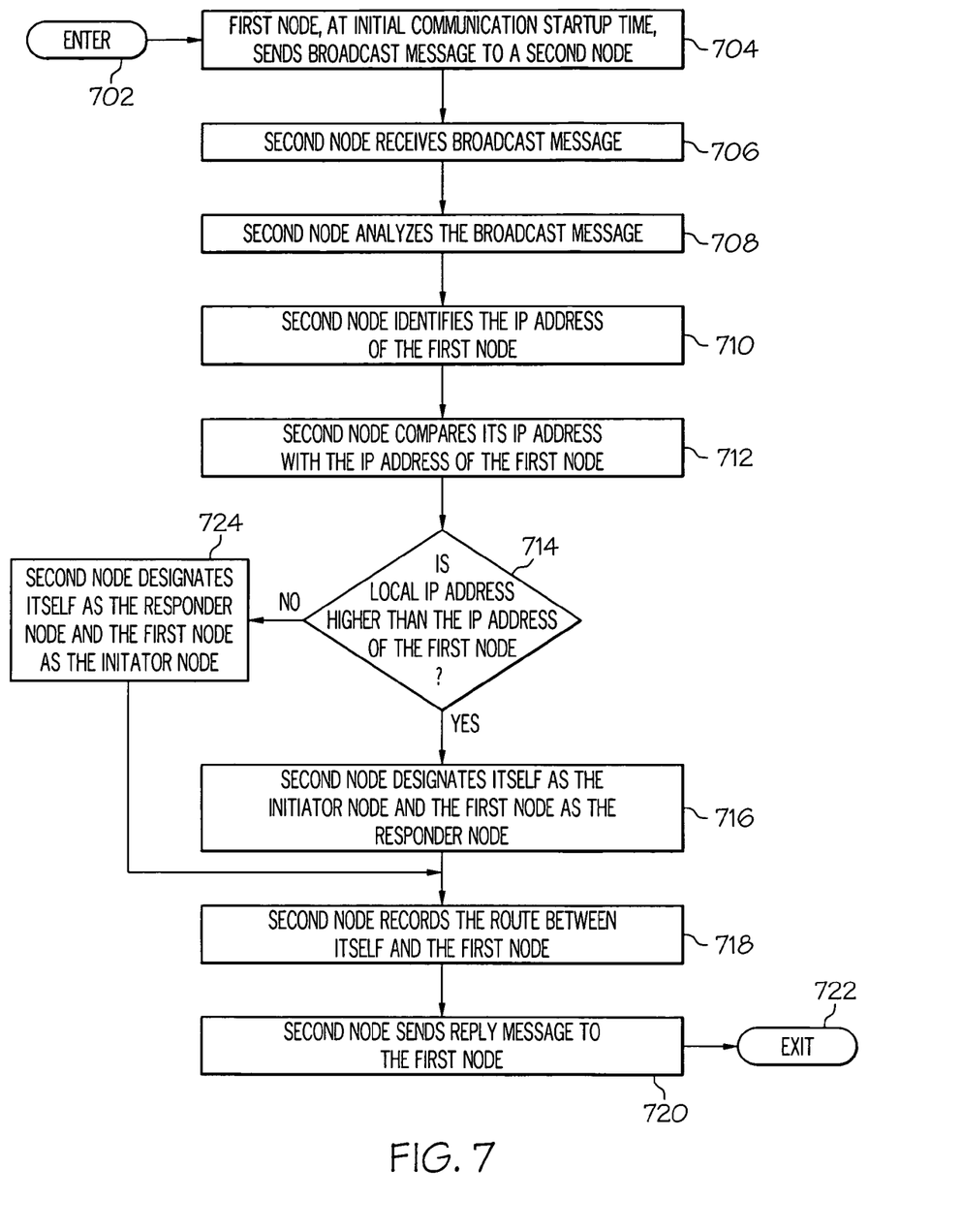
FIG. 7 is an operational flow diagram illustrating one process for designating a node as either an initiator node or a responder node according to one embodiment of the present invention.

FIG. 7 is an operational flow diagram illustrating a process of designating a node as either an initiator node or a responder node. The operational flow diagram of FIG. 7 begins at step 702 and flows directly to step 704. A first node 302, at an initial communication startup time, sends a broadcast message to at least a second node 304 at step 704. The second node 304, at time 706, receives the broadcast message.

The ML interface 308 of the second node 304, at step 708, analyzes the broadcast message. The ML interface 308 of the second node 304, at step 710, identifies the IP address of the first node via the broadcast message. The ML interface 308 of the second node 304, at step 712, compares its IP address to the IP address of the first node 302. The ML interface 308 of the second node 304, at step 714, determines if its IP address is higher than the IP address of the first node 302. If the result of this determination is positive, the ML interface 308 of the second node 304 designates the second node 304, at step 716, as the initiator node and the first node 302 as the responder node.

The ML interface 308 of the second node 304, at step 718, records the route between the second node 304 and the first node 302. The ML interface 308 of the second node 304, at step 720, sends a reply message back to the first node. The control flow then exits at step 722. Returning to step 714, if the result of this determination is negative, the ML interface 308 of the second node 304, at step 724, designates the second node 304 as the responder node and first node 302 as the initiator node. The control flow then flows to step 718 discussed above.

Operational Flow for Multi-Link Probing Request Overhead Reduction

Figure 8:
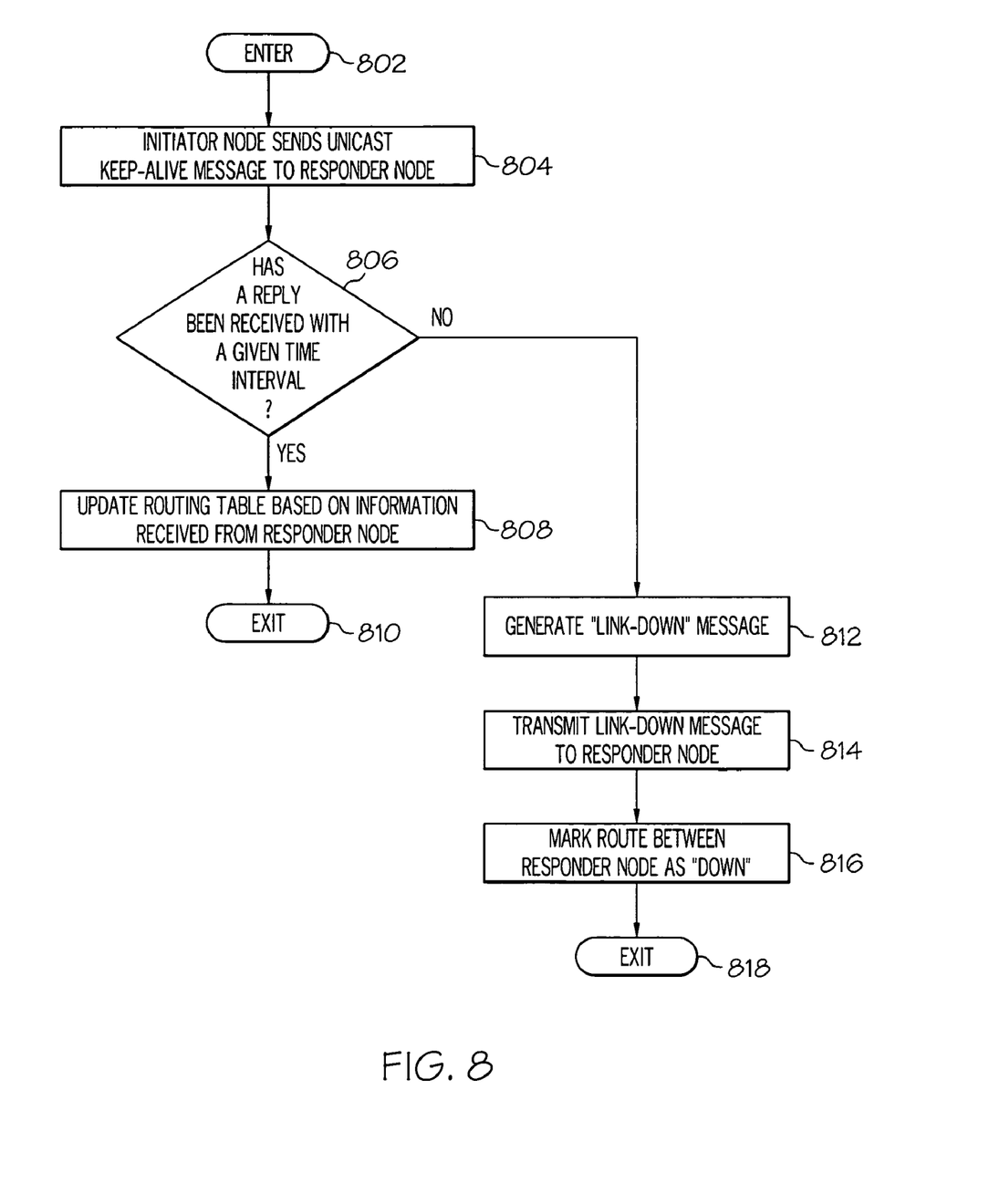
FIG. 8 is an operational flow diagram illustrating one process for reducing probing request traffic in a multi-link networking environment according to one embodiment of the present invention.

FIG. 8 is an operational flow diagram illustrating one process for reducing overhead created by multi-link probing requests. The operational flow diagram of FIG. 8 begins at step 802 and flows directly to step 804. The initiator node 302, at step 804, sends a unicast keep-alive message to the responder node 304.

The ML interface 306 of the initiator node 302, at step 806, determines if a reply has been received from the responder node within a given time interval. If the result of this determination is positive, the ML interface 306 of the initiator node 302, at step 808, updates its routing table based on the information received in the reply message. The control flow then exits at step 810. It should be noted that the responder node 304 also updates its routing table in response to receiving the request from the initiator node 302. Therefore, only one unicast probing request is needed to be sent between the pair of nodes 302, 304. Returning to step 806, if the result of this determination is negative, the ML interface 306 of the initiator node 302, at step 812, generates a "link-down" message to notify the responder node 304 that the link is down. The ML interface 306 of the initiator node 302, at step 814, transmits the link-down message to the responder node 304. The ML interface 306 of the initiator node 302, at step 816, marks the route between the responder node 304 as down. The control flow then exits at step 818.

Another Operational Flow for Multi-Link Probing Request Overhead Reduction

Figure 9:
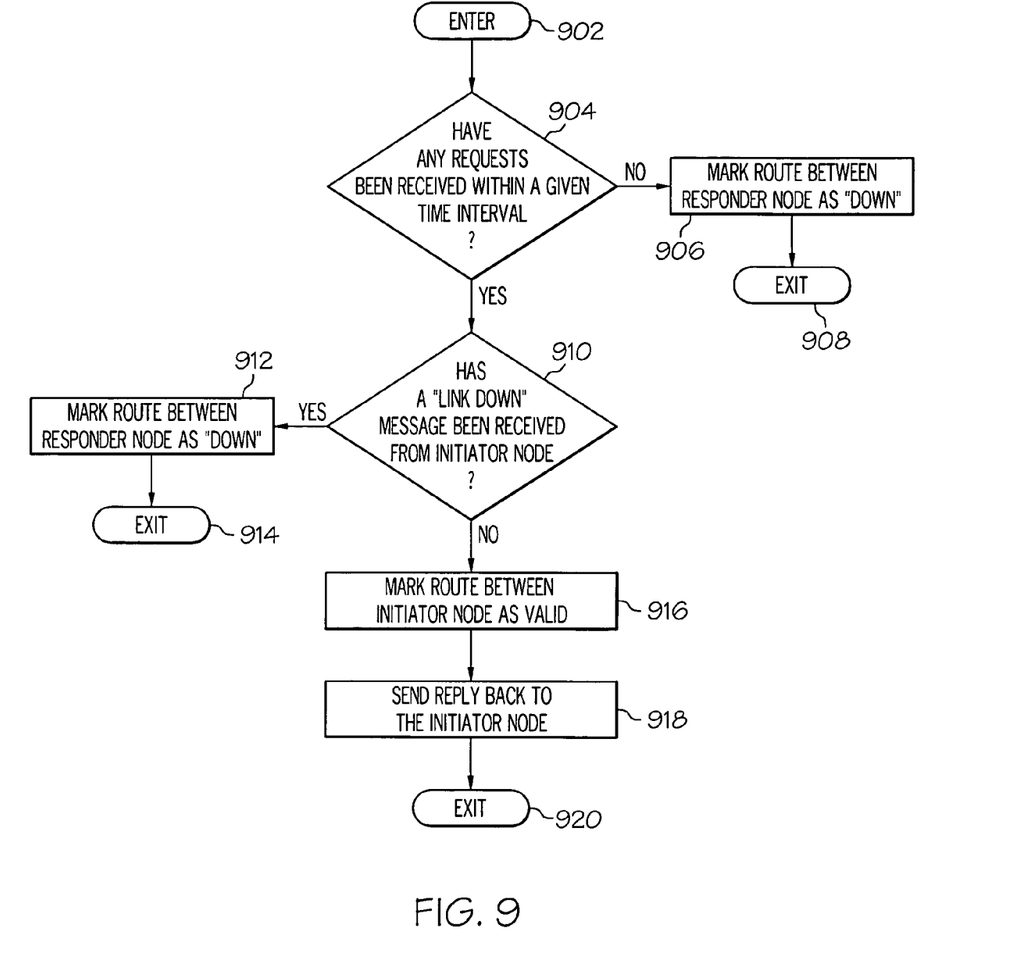
FIG. 9 is an operational flow diagram illustrating another process for reducing probing request traffic in a multi-link networking environment according to one embodiment of the present invention.

FIG. 9 is an operational flow diagram illustrating another process for reducing overhead created by multi-link probing requests. . The operational flow diagram of FIG. 9 begins at step 902 and flows directly to step 904. The ML interface 308 of the responder node 304, at step 904, determines if a request from an initiator node 302 has been received within a given time interval. If the result of this determination is negative, the ML interface 308 of the responder node 304, at step 906, marks the route between the initiator node 302 as being down. The control flow exits at step 908.

If the result of this determination is positive, the ML interface 308 of the responder node 304, at step 910, determines if a link-down message has been received from the initiator node 302. If the result of this determination is positive, the ML interface 308 of the responder node 304, at step 912, marks the route between the initiator node 302 as being down. The control flow exits at step 914. If the result of this determination is negative, the ML interface 308 of the responder node 304, at step 916, marks the route between the initiator node 302 as valid. The ML interface 308 of the responder node 304, at step 918, sends a reply back to the initiator node. The control flow exits at step 920.

Non-Limiting Examples

The present invention can be realized in hardware, software, or a combination of hardware and software. A system according to one embodiment of the invention can be realized in a centralized fashion in one computer system or in a distributed fashion where different elements are spread across several interconnected computer systems. Any kind of computer system—or other apparatus adapted for carrying out the methods described herein—is suited. A typical combination of hardware and software could be a general purpose computer system with a computer program that, when being loaded and executed, controls the computer system such that it carries out the methods described herein.

In general, the routines executed to implement the embodiments of the present invention, whether implemented as part of an operating system or a specific application, component, program, module, object or sequence of instructions may be referred to herein as a "program." The computer program typically is comprised of a multitude of instructions that will be translated by the native computer into a machine-readable format and hence executable instructions. Also, programs are comprised of variables and data structures that either reside locally to the program or are found in memory or on storage devices. In addition, various programs described herein may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A method for maintaining network routing information, the method comprising:
   receiving, by a first node, a route status request from a second node, wherein receiving the route status request by the first node prevents the first node from sending a route status request to the second node;
   storing, at the first node only in response to receiving the route status request, a status at the first node indicating that a route from the second node to the first node is valid; and
   transmitting, by the first node, a route status reply to the second node.

2. The method of claim 1, further comprising:
   receiving, by the second node, the route status reply from the first node; and
   storing, by the second node, a routing table to indicate that the route between itself and the first node is valid in response to receiving the route status reply from the first node.

3. The method of claim 1, further comprising:
   comparing, by the first node, an IP address of the first node to an IP address of the second node; and
   determining, by the first node, that the first node is a responder for route status requests sent between the first node and the second node in response to the comparing indicating that the IP address of the first node is lower that the IP address of the second node.

4. The method of claim 1, further comprising:
   comparing, by the second node, an IP address of the second node to an IP address of the first node; and
   determining, by the second node, that the first node is an initiator of route status requests between the second node and the first node in response to the comparing indicating that the IP address of the second node is higher that the IP address of the first node.

5. The method of claim 1, further comprising:
   determining, by the second node, that a pre-determined time interval has elapsed prior to receiving a route status reply;
   updating, by the second node in response to determining that the pre-determined time interval has elapsed prior to receiving a route status reply, a routing table to indicate that a route between the second node and the first node is invalid; and
   transmitting, by the second node in response to determining that the pre-determined time interval has elapsed prior to receiving a route status reply, a link-down message to the first node.

6. The method of claim 1, further comprising:
   receiving, by the first node, a link-down message from the second node, wherein the link-down message indicates that a route between the first node and the second node has failed; and
   updating, by the first node in response to receiving the link-down message, a routing table to indicate that the route between itself and the second node is invalid.

7. The method of claim 1, wherein the first node and the second node are within a multi-link networking environment.

8. A computing node device, within a networking environment, for maintaining network routing information, the computing node device comprising: a network interface adapted to receive a route status request from at least one other computing node device, wherein receiving the route status request from the at least one other computing node device prevents the network interface from sending a route status request to the at least one other computing node device, and wherein the network interface is further adapted to, store, only in response to the route status request being received, a status indicating that a route from the at least one other computing node device to the computing node device is valid, and wherein the network interface adapter is further adapted to, transmit a route status reply to the at least one other computing node device.

9. The computing node device of claim 8, wherein the network interface is further adapted to: receive, in response to transmitting a second route status, a second route status reply from a second other computing node device; and store, in response to receiving the second route status reply from the second other computing node device, a routing table to indicate that a second route between the computing node device and the second other computing node device is valid.

10. The computing node device of claim 8, wherein the network interface is further adapted to: compare a local IP address to an IP address of the at least one other computing node device; and assume a role as a responder for route status requests with respect to the at least one other computing node device in response to the comparing indicating that the local IP address is lower than the IP address of the at least one other computing node device.

11. The computing node device of claim 8, wherein the network interface is further adapted to: compare an IP address of the computing node device to an IP address of the at least one other computing node device; and determine that the at least one other computing node device is an initiator of route status requests between the computing node device and the at least one other computing node device in response to the comparing indicating that the IP address of the computing node device is higher than the IP address of the at least one other computing node device.

12. The computing node device of claim 8, wherein the network interface is further adapted to: determine that a pre-determined time interval has elapsed prior to receiving a route status reply; update, in response to determining that the pre-determined time interval has elapsed prior to receiving a route status reply, a routing table to indicate that a route between the at least one other computing node device and the computing node device is invalid; and transmit, in response to determining that the pre-determined time interval has elapsed prior to receiving a route status reply, a link-down message to the at least one other computing node device.

13. The computing node device of claim 8, wherein the network interface is further adapted to: receive a link-down message from the at least one other computing node device, wherein the link-down message indicates that a route between the computing node device and the at least one other computing node device has failed; and update, in response to the link-down message being received, a routing table to indicate that the route between the computing node device and the at least one other computing node device is invalid.

14. The computing node device of claim 8, wherein the computing node device and the at least one other computing node device are within a multi-link networking environment.

15. A computer program storage product for maintaining network routing information, the computer program storage product comprising:
   a non-transitory storage medium readable by a processing circuit and storing instructions for execution by the processing circuit for performing a method comprising:
   receiving, by a first node, a route status request directly from a second node, wherein the route status request comprises a request from the second node for a route status reply from the first node, wherein the route status reply comprises information associated with a route between the first node and the second node;
   storing, at the first node only in response to receiving the route status request, a status at the first node indicating that a route from the second node to the first node is valid; and
   transmitting, by the first node, the route status reply to the second node.

16. The computer program storage product of claim 15, further comprising instructions for:
   receiving, by the second node, the route status reply from the first node; and
   storing, by the second node, a routing table to indicate that the route between itself and the first node is valid in response to receiving the route status reply from the first node.

17. The computer program storage product of claim 15, further comprising instructions for:
   comparing, by the first node, an IP address of the first node to an IP address of the second node; and
   determining, by the first node, that the first node is a responder for route status requests sent between the first node and the second node in response to the comparing indicating that the IP address of the first node is lower than the IP address of the second node.

18. The computer program storage product of claim 15, further comprising instructions for:
   comparing, by the second node, an IP address of the second node to an IP address of the first node; and
   determining, by the second node, that the first node is an initiator of route status requests between the second node and the first node in response to the comparing indicating that the IP address of the second node is higher than the IP address of the first node.

19. The computer program storage product of claim 15, further comprising instructions for:
   determining, by the second node, that a pre-determined time interval has elapsed prior to receiving a route status reply;
   updating, by the second node in response to determining that the pre-determined time interval has elapsed prior to receiving a route status reply, a routing table to indicate that a route between the second node and the first node is invalid; and
   transmitting, by the second node in response to determining that the pre-determined time interval has elapsed prior to receiving a route status reply, a link-down message to the first node.

20. The computer program storage product of claim 15, further comprising instructions for:
   receiving, by the first node, a link-down message from the second node, wherein the link-down message indicates that a route between the first node and the second node has failed; and
   updating, by the first node in response to receiving the link-down message, a routing table to indicate that the route between itself and the second node is invalid.

* * * * *